United States Patent

Cearley et al.

[11] Patent Number: 4,882,123
[45] Date of Patent: Nov. 21, 1989

[54] HAFNIUM CONTROL ROD FOR NUCLEAR REACTORS

[75] Inventors: James E. Cearley; David A. Salmon; Paul Van Diemen, all of San Jose, Calif.

[73] Assignee: General Electric Company, San Jose, Calif.

[21] Appl. No.: 162,449

[22] Filed: Mar. 1, 1988

[51] Int. Cl.⁴ .................................................. G21C 7/10
[52] U.S. Cl. ...................................... 376/333; 376/243; 376/327
[58] Field of Search ................ 376/327, 333, 353, 243

[56] References Cited

U.S. PATENT DOCUMENTS

| | | | |
|---|---|---|---|
| 3,115,452 | 12/1963 | Rock | 376/327 |
| 3,121,045 | 2/1964 | Harris et al. | 376/333 |
| 3,255,086 | 6/1966 | Hitchcock | 376/333 |
| 3,332,850 | 7/1967 | Jonsson et al. | 376/327 |
| 4,231,843 | 11/1980 | Myron et al. | 376/353 |
| 4,451,428 | 5/1984 | Nishimura et al. | 376/333 |
| 4,562,038 | 12/1985 | Assedo et al. | 376/353 |
| 4,655,999 | 4/1987 | Maruyama et al. | 376/333 |
| 4,676,948 | 6/1987 | Cearley et al. | 376/333 |

FOREIGN PATENT DOCUMENTS

| | | | |
|---|---|---|---|
| 0066190 | 6/1977 | Japan | 376/333 |
| 0159585 | 12/1979 | Japan | 376/327 |
| 0192992 | 11/1984 | Japan | 376/333 |
| 0220893 | 11/1985 | Japan | 376/333 |

Primary Examiner—Harvey E. Behrend
Attorney, Agent, or Firm—Robert R. Schroeder

[57] ABSTRACT

A neutron absorbing control device for service in nuclear reactors utilizing fissionable fuel. The control device includes hafnium metal as the neutron absorbing material which is employed in a unique structure which maximizes the advantages of hafnium while minimizing its disadvantages as well as providing other benefits.

5 Claims, 3 Drawing Sheets

HAFNIUM CONTROL ROD FOR NUCLEAR REACTORS

FIELD OF THE INVENTION

This invention relates to an improved control rod construction, utilizing hafnium metal as the neutron absorber, for service in nuclear reactors having a core of fissionable fuel.

BACKGROUND OF THE INVENTION

Commercial nuclear fission reactors for generating power normally comprise a core of fissionable fuel wherein the fuel material is sealed within tube-like metal containers. These tubular containers with the fuel are arranged or grouped in discrete bundles or units, which frequently are enclosed within an open ended housing known as a "channel" in the nuclear fuel industry. The discrete fuel bundles are assembled for service within the nuclear reactor to provide the core in predetermined patterns The assembled bundles are spaced apart from each other so as to provide intermediate gaps between each bundle, forming a surrounding area for the flow of coolant thereabout and also the insertion of reactor control means comprising neutron absorbing material.

Nuclear reactor control means typically consist of components containing neutron absorbing compositions which are reciprocally movable in relation to the core body of neutron emitting fuel undergoing fissions. The rate of the fission reaction, and in turn heat generated, is regulated by governing the availability of fission produced neutrons for furthering the fission reaction and determining the magnitude of the reaction.

In a conventional nuclear reactor, fissionable atoms such as uranium isotopes and plutonium absorb neutrons in their nuclei and undergo a nuclear disintegration or splitting. This fission produces on the average of two products of lower atomic weight and greater kinetic energy, and typically two or three neutrons, also of high energy.

The fission neutrons thus produced diffuse through the core containing fissionable fuel and they are either utilized or lost in several distinct competing mechanisms. Some neutrons may migrate to the boundaries of the core and escape whereby they are lost from the system. Some neutrons undergo nonfission or radiative capture in the fuel material. Other neutrons undergo fission capture within the fissionable fuel and thereby produce additional fission neutrons, the so-called chain reaction. Namely, fast neutrons are captured in the uranium 235 and 238, while thermal neutrons are captured in uranium 235. Still other neutrons undergo parasitic capture in the various extraneous or nonfissionable compositions of the core and adjoining components such as the moderator, coolant, various structural materials, fission products produced within the fuel, as well as the reactor control elements.

The balance between the fission production of neutrons and the various competing mechanisms for neutron consumption determine whether the fission reaction is self-sustaining, decreasing, or increasing. When the fission reaction is self-sustaining, the neutron multiplication factor equals 1.00, the neutron population remains constant, and on average there is one neutron remaining from each fission event which induces a subsequent fission of an atom.

Heat produced by the fission reactions is thereby continuous and is maintained as long as sufficient fissionable material is present in the fuel system to override the effects of fission products formed by the reaction, some of which have a high capacity for absorbing neutrons The heat produced by the fission reactions is removed by a coolant such as water, circulating through the core in contact with the tubular containers of fuel and conveyed on to means for its utilization, such as the generation of electrical power.

The neutron population, and in turn the heat or power produced, of a nuclear reaction, depends on the extent to which neutrons are consumed or wasted by capture in nonfissionable material. Neutron consumption of this nature is regulated by governing the relative amount of neutron absorbing control material imposed into the core of fissionable fuel undergoing fission reactions.

Control devices comprising elements containing neutron absorbing material, are commonly provided in the form of rods, sheets or blades. The elements are provided with mechanical or fluid operated means for reciprocal movement into and out from the core of fissionable fuel to any appropriate extent or depth for achieving the desired neutron population, and in turn, level of reaction Common neutron absorbing materials include elemental or compound forms of boron, cadmium, gadolinium, europium, erbium, samarium, hafnium, dysprosium, silver and indium.

Commercial nuclear reactors for power generation are of such a magnitude that the control means, or systems, comprises a plurality of control units or rods. Each individual control unit or rod is selectively and reciprocally insertable to variable degrees of penetration into the fuel core by movement intermediate the discrete bundles of grouped tubular fuel containers through the spaces or gaps provided throughout the assembly of multiple fuel bundles. A common design for control rods, as shown in U.S. Letters Pat. No. 3,020,888, consists of an element having four blades, comprising sheaths containing neutron absorbing material, having a cross or cruciform cross section, whereby the four blades radially project at right angles to each other. With this design configuration, each control rod element is insertable into the spaces between four adjacent fuel bundles of the core assembly, and regulates the neutron flux or density emitted from the fissioning fuel of the four bundles.

The construction designs, materials, operating mechanisms and functions of typical control mean for water cooled and moderated nuclear fission reactors for commercial power generation are illustrated and described in detail in the prior art, for example, U.S. Letters Pat. No. 3,020,781; No. 3,020,888; No. 3,217,307; No. 3,395,781; No. 3,397,759; No. 4,285,769; No. 4,624,826; and No. 4,676,948, and elsewhere throughout the literature dealing with nuclear reactors. The contents of the foregoing prior art patents are incorporated herein by reference.

SUMMARY OF THE INVENTION

This invention comprises an improved control device for nuclear fission reactors comprising a combination of a unique construction and application of a material composition for service in water cooled and moderated nuclear fission reactors.

OBJECTS OF THE INVENTION

It is a primary object of this invention to provide an improved control device for nuclear fission reactors which provides for the effective utilization of hafnium metal through reduced weight and costs.

It is also an object of this invention to provide an improved control device for nuclear fission reactors comprising components which enable easy construction of units having variable neutron absorbing capacities across their length and breadth that selectively match or equate the absorptive capacity of the device with the uneven neutron densities in the region of service and thereby provide a saving in eliminating unneeded absorbent material.

It is a further object of this invention to provide an improved control device for nuclear fission reactors which provides for flow of coolant within the control device means whereby the presence of water in liquid form is maximized to enhance neutron moderation and entrapment, comprising a so-called neutron "flux trap".

It is a still further object of this invention to provide an improved control device which overcomes the adverse effects of structural distortion or induced stresses caused by differences in thermal expansion and/or irradiation growth resulting from different material and/or regional variations in radiation levels.

It is another object of this invention to provide a control device which provides for maintaining tolerances in the structure of the neutron absorbent material for consistent performance.

DETAILED DESCRIPTION OF THE INVENTION

Figure 1:
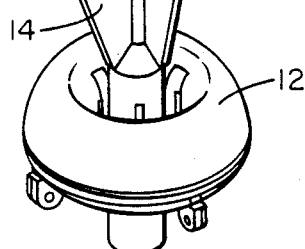
FIG. 1 is a perspective view of a control device with part cut away.

Referring to FIG. 1 of the drawings, this invention is hereinafter described and illustrated with reference to a common commercial design for nuclear fission reactor control devices, wherein the control elements are of cruciform cross section, and the preferred embodiment. Control devices with cruciform control elements and their utilization with fuel core assemblies are shown and described in the prior art comprising the above cited U.S. Letters Patents.

Control device 10 comprises a base 12 which is coupled to a suitable control device drive mechanism (not shown), and supports a frame 14 of the neutron absorbing element including an upper support member 16 and a lower support member 18 and an elongated central spine support 20, or tie rod, connecting said upper and lower support members. Upper support member 16 can also function as a handle to facilitate transportation and manipulation of the device.

In the preferred cruciform embodiment for the element of this invention, the upper and lower support members 16 and 18, respectively, each comprise four radially extending arms projecting at about 90 degrees with respect to adjacent arms to form the cross. Central spine support 20, connecting the upper and lower support member 16 and 18, is preferably also a cruciform configuration with four abbreviated arms of relatively short radial extension in relation to the arms projecting from the upper and lower support members 16 and 18.

The four radially extending arms projecting from the upper and lower support members 16 and 18, and the four abbreviated radial arms of the central spine support 20, are each respectively aligned in a plane with their counterpart to provide a cross configuration. The four arms of the upper and lower support members 16 and 18 are also substantially conterminous with respect to each other.

A metal sheath 22 extends from each arm of the upper support 16 to each respective counterpart arm of the lower support 18 and adjoins the central elongated spine support 20 along its length. Sheath 22 typically comprise a U-shaped sheet metal housing of blade-like configuration and an internal width comparable to the thickness of the arms of the upper and lower supports. Preferably, each sheath is secured to its respective adjoining arms of the upper and lower support members 16 and 18, and also to the central spine support 20, by suitable means such as welding. Sheath 22 is also provided with a plurality of orifices 24 for the passage of coolant water.

The foregoing structure of the control device of this invention is typical of common commercial control means in service in operating nuclear reactors. The structure of the foregoing frame 14 and its components are normally constructed of stainless steel or similar corrosion resisting metals.

In accordance with this invention, the neutron absorbing component of the control device element comprises the combination of hafnium metal utilized in the specific form of a plurality of flattened hollow tubes provided with orifices in the tube walls substantially as illustrated. The flattened hollow tubes comprise a structure of two substantially parallel sides of various predetermined thicknesses in close proximity which are joined together along their length with arcs of small radius.

Figure 2:
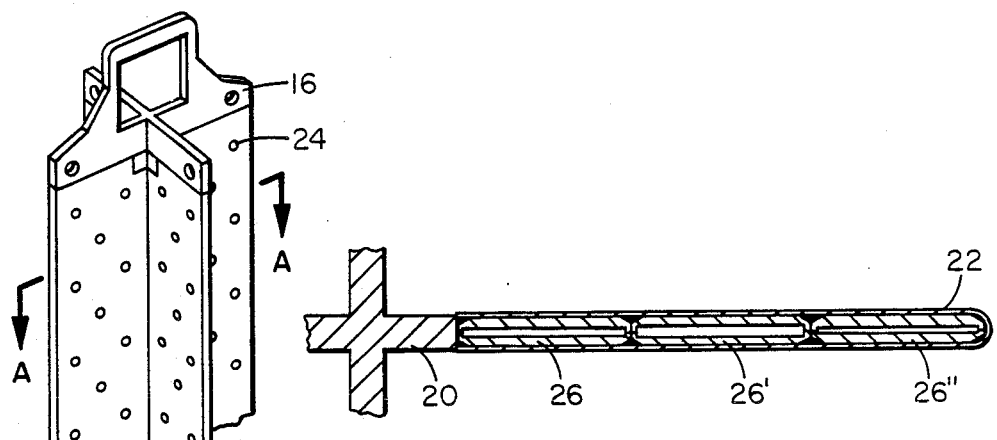
FIG. 2 is a cross sectional view of the control devices of FIG. 1 taken along the line A—A.
Figure 3:
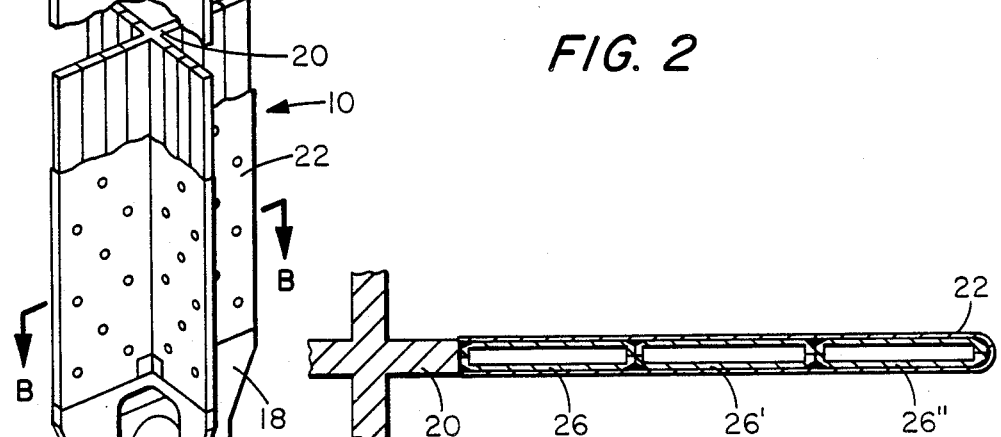
FIG. 3 is a cross sectional view of the control device of FIG. 1 taken along the line B—B.
Figure 5:
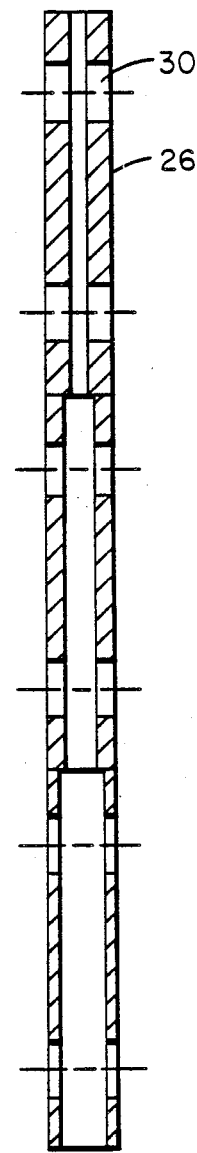
FIG. 5 is a cross sectional view of the hafnium metal tube of FIG. 4 taken along the line C—C.
Figure 6:
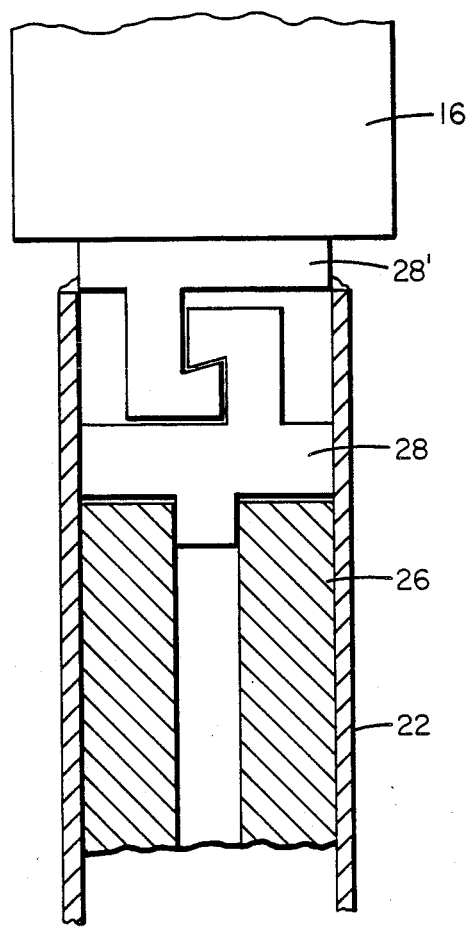
FIG. 6 is a plain view of an attachment for affixing the hafnium metal tube to the upper support structure with a part in section.

Referring to the drawings, in particular FIGS. 1, 2 and 3, a plurality of flattened hollow tubes 26 of hafnium metal are arranged parallel with each other and vertically aligned with the central spine support 20 within each sheath 22 of the control device, such as tubes 26, 26$^I$ and 26$^{II}$. The flattened hollow tubes of hafnium 26 are preferably supported within the sheath housing by suitable attachment to the respective arm of the upper support member 16. Measures for affixing the hafnium tubes to the upper support member 16 are disclosed in U.S. Letter Pat. No. 4,676,948, and one advantageous means is illustrated in FIG. 5. As shown, a complementing hooking unit 28–28$^I$ is provided by securing, such as by welding, one hook component 28 to the top of the hafnium tube 26 and the other hook component 28 to the upper support member 16. Such an arrangement enables easy replacement as well as initial assembly.

The plurality of hafnium neutron absorber tubes 26 affixed to the upper support member 16 within the sheath 22 extend downward substantially to, but preferably short of contact to the lower support member 18. Thus free hanging, the hafnium tubes can elongate due to thermal expansion and/or irradiation growth without imposing any stresses or other distorting forces upon the frame members.

As shown in FIGS. 2 and 3, in accordance with this invention, the wall thickness, and in turn mass, of each flattened side of the tube of hafnium metal neutron absorber 26 assembled within each sheath 22 can be varied and adjusted to selectively match or equate the neutron absorption capability of the element extending along the outward reach of the radially projecting absorbing blade to the uneven neutron flux conditions encountered along its surface in service. Generally, the neutron flux density is greatest at the outermost extremity or periphery of the blades, and least in an intermediate area of their outward reach. Thus, the neutron absorbing mass is designed to correspond to the needs of the varying neutron flux field. This aspect of the invention provides for customizing the neutron absorbing mass of the control element to provide ample neutron absorbing capacity to perform its designed function without over applying an excess of costly and heavy hafnium.

Figure 4:
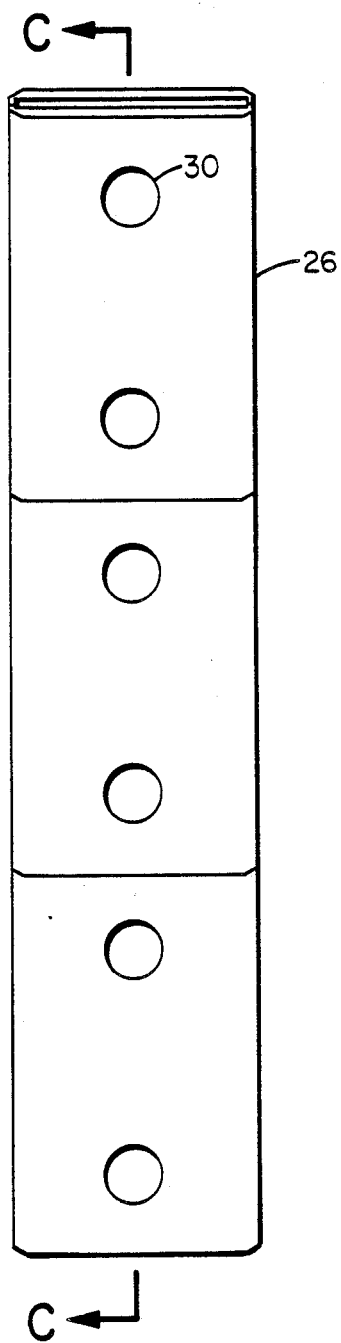
FIG. 4 is an elevation view of a hafnium metal tube of the control device with parts cut away.

Similarly, as shown in FIG. 4, the side wall thickness, and in turn mass, of each tube of hafnium metal neutron absorber 26 assembled in each sheath 22 can be varied and adjusted to selectively match or equate the neutron absorption capability of the absorbing blade along its length from top to bottom of the element for the same objective. Sequentially varying or gauging the absorber tube side wall thickness in any effective arrangement to accommodate variable neutron flux conditions along the length of the element can be provided for by uniting several sections of flattened hollow tubes of hafnium having different wall thickness. Suitable means for achieving this aspect of the invention comprises welding a series of two or more segments of tubing abutting end to end to join the segments into a continuous unit. This vertical customizing to match or equate the neutron absorption capacity to the neutron flux or density pattern encountered over the sheath or blade surface also avoids the unnecessary application of an excess of costly and heavy hafnium metal beyond the need of the variable neutron flux field.

The control device sheath 22 and the hafnium metal tubes 26 are both provided with a plurality of openings or orifices 24 and 30 through their walls, providing for passage or flow of ambient fluid into and out from their interior area. Enabling entry and the presence of coolant water within the flattened hollow tubes 26 of hafnium metal provides an arranged combination of substance media which forms a so-called neutron "flux trap", a more effective means for reducing the energy of and capturing neutrons.

Long service life control rod devices in water cooled and moderated fission reactors utilize a principle of operation wherein the neutron material is concentrated in a small region to provide for neutron self-sheilding. The self-shielding effect delays absorption of neutrons inside the absorber until significant absorptions have occurred at the outer surface regions. This delay increases the service life of the control device.

The principle underlying the so-called "flux trap" is the removal of some of the absorber material and to replace it with moderator, and the absorber material must be removed from within the absorber unit.

This invention incorporates and enhances the neutron "flux trap" system by providing for the flow of water coolant/ moderation into and through the hollow interior of the hafnium metal tubes. In the "flux trap" of the construction of this invention, the higher energy neutrons which pass through the metal absorber wall initially without any interaction are subsequently moderated, i.e., slowed down in energy level, by the internal water moderator and then are absorbed in the inside surface area of the hollow absorber tubes. This "flux trap" effect compensates for the reduction in absorber material due to the hollow interior of the hafnium tube, and provides for the unit to maintain the same reactivity worth as control device of solid metal design. Thus, there is a significant benefit in reduced weight and costs, especially with hafnium metal which is extremely heavy and expensive.

What is claimed is:

1. An improved control device for nuclear fission reactor having a core of fissionable fuel in an assembly composed of fuel units grouped into spaced apart bundles which are immersed in liquid coolant in operating service, and wherein said control device is provided with means for reciprocal movement into and out from the core of fuel intermediate the spaced apart bundles of the assembly, said control device having a frame including an upper and a lower support member connected by an elongated central spine support with the upper and lower support members each of a transverse cruciform configuration having four radially extending arms projecting outward from the central spine support and a sheath of blade-like configuration extending from each of the arms of the upper support to each of the arms of the lower support and each of said sheaths longitudinally adjoining the spine support, each sheath containing therein a neutron absorbing component consisting essentially of a plurality of parallel flattened hollow tubes of hafnium metal with their axis aligned with the spine support, and each sheath and each of the plurality of parallel flattened hollow tubes therein in their flattened portions being each provided with a multiplicity of openings along their length for entry and the presence of liquid coolant through the length of the flattened hollow tubes of hafnium.

2. The improved control device of claim 1, wherein the plurality of parallel flattened hollow tubes of hafnium metal contained within the sheaths are affixed to the upper support member with attachment means and free hanging therefrom short of contact with the lower support member to preclude any stresses due to the tubes thermal expansion or irradiation growth.

3. The improved control device of claim 1, wherein the wall thickness of the plurality of parallel flattened hollow tubes of hafnium metal vary in their longitudinal axial dimension.

4. The improved control devices of claim 1, wherein parallel adjoining flattened hollow hafnium metal tubes contained within a blade-like sheath are of varying wall thickness in the same transverse plane.

5. An improved control device for a nuclear fission reactor having a core of fissionable fuel in an assembly composed of fuel units grouped into spaced apart bundles which are immersed in liquid coolant, in operating service, and wherein said control device is provided with means for reciprocal movement into and out from the core of fuel intermediate the spaced apart bundles of the assembly, said contact device having a frame including an upper and a lower support member connected by an elongated axial spine support with the upper and lower support members each comprising a plurality of radially extending arms projecting outward from the axial spine support, said radially projecting arms of the upper and lower support member being conterminously aligned with their counterpart, a sheath of blade-like configuration extending from each radially projecting arm of the upper support member to the aligned counterpart radially extending arm of the lower support member with each of said sheaths longitudinally adjoining the axial spine support and each sheath containing therein a neutron absorbing component consisting essentially of a plurality of parallel flattened hollow tubes of hafnium metal affixed to their adjoining upper support member with attachment means and free hanging therefrom short of contact with the lower support member and extend with their axis aligned with the spine support, said flattened hollow tubes of hafnium having wall thickness which vary in dimensions in the same transverse plane and are of reduced dimensions adjacent to the lower member, each of said sheaths and each of said hafnium tubes in their flattened portions being each provided with a multiplicity of openings therethrough along their length for passage of liquid coolant into and through the length of the flattened hollow tubes of hafnium.

* * * * *